United States Patent
Nadeau et al.

(10) Patent No.: US 7,447,167 B2
(45) Date of Patent: Nov. 4, 2008

(54) METHOD AND APPARATUS FOR THE CREATION AND MAINTENANCE OF A SELF-ADJUSTING REPOSITORY OF SERVICE LEVEL DIAGNOSTICS TEST POINTS FOR NETWORK BASED VPNS

(75) Inventors: Thomas D. Nadeau, Hampton, NH (US); Michael T. Piecuch, Nashua, NH (US); Vanson Lim, Nashua, NH (US); Robert Hanzl, Hostivice (CS)

(73) Assignee: Cisco Technology, Inc., San Jose, CA (US)

( * ) Notice: Subject to any disclaimer, the term of this patent is extended or adjusted under 35 U.S.C. 154(b) by 661 days.

(21) Appl. No.: 11/091,058

(22) Filed: Mar. 28, 2005

(65) Prior Publication Data

US 2006/0215579 A1    Sep. 28, 2006

(51) Int. Cl.
*H04L 12/28* (2006.01)
(52) U.S. Cl. .................................... 370/254
(58) Field of Classification Search ............... 370/254, 370/255, 386, 389, 392, 395.3, 395.31, 395.32, 370/395.53, 400, 401, 409
See application file for complete search history.

(56) References Cited

U.S. PATENT DOCUMENTS

| 6,205,488 | B1 | 3/2001 | Casey et al. ............ 709/238 |
| 6,396,810 | B1 | 5/2002 | Hebel ..................... 370/248 |
| 6,813,242 | B1 | 11/2004 | Haskin et al. ........... 370/229 |
| 2003/0117962 | A1 | 6/2003 | Mattson et al. ......... 370/250 |
| 2004/0218595 | A1 | 11/2004 | Acharya et al. ......... 370/389 |
| 2005/0013259 | A1 | 1/2005 | Papoushado et al. ..... 370/254 |
| 2006/0168208 | A1* | 7/2006 | Nagami ................. 709/224 |
| 2006/0182122 | A1* | 8/2006 | Davie et al. ........ 370/395.53 |

OTHER PUBLICATIONS

Peter J. Welcher, BGP and MPLS-Based VPNs, Oct. 4, 2000, Chesapeake Netcraftsmen, pp. 4-5.*
A. Brooks and L. Sacks, A Methodology for Monitoring LSP Availability in MPLS Networks, 2002, University College London, p. 3, http://www.ee.ucl.ac.uk/lcs/papers2002/LCS092.pdf.*
Eric. C. Rosen and Yakov Rekhter, BGP/MPLS IP VPNs, 2003, The Internet Society, pp. 11-12, 16 and 24-26.*

* cited by examiner

*Primary Examiner*—Chirag G Shah
*Assistant Examiner*—Ashley L Shivers
(74) *Attorney, Agent, or Firm*—BainwoodHuang

(57) ABSTRACT

A method and apparatus for producing and maintaining a repository of service level test points for network based VPNs is presented. A determination is made regarding whether there is more than one Autonomous System (AS) in a network for one or more VPNs. When there is not more than one AS then next hops are found for the VPN. Next, VPN prefixes associated with the VPN are found and a set of Label Switching Paths (LSPs) in use for the VPN are produced. When the determination is that there is more than one AS then routers in the present AS associated with the VPN are found. VPN label stacks are used to find all Provider Edge (PE) routers associated with the VPN. A set of LSPs in use for the VPN is produced from the routers and the VPN label stacks

19 Claims, 5 Drawing Sheets

METHOD AND APPARATUS FOR THE CREATION AND MAINTENANCE OF A SELF-ADJUSTING REPOSITORY OF SERVICE LEVEL DIAGNOSTICS TEST POINTS FOR NETWORK BASED VPNS

BACKGROUND

Computer networks typically provide a physical interconnection between different computers to allow convenient exchange of programs and data. A plurality of connectivity devices, such as switches and routers, interconnect each user computer connected to the network. The connectivity devices maintain routing information about the computers and perform routing decisions concerning message traffic passed between the computers via the connectivity devices. Each connectivity device, or router, corresponds to a network routing prefix indicative of the other computers, which it has direct, or indirect access to. Therefore, data routed from one computer to another follows a path through the network defined by the routers between the two computers.

The routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer. However, network problems may arise which render routers and transmission paths between routers inoperable.

There are two families of path characteristics, and the verification/diagnostics there of, that are of particular interest when considering network-based Internet Protocol (IP) Virtual Private Networks (VPNs). The first family of path characteristics relate to path verification in terms of basic connectivity. The second group of characteristics of interest to a customer of a network-based VPN fall under the umbrella of real-time statistics. These real-time statistics can be defined as the ability for a customer edge (CE) router to obtain real-time statistics related to a particular path used by that CE to carry its traffic across the core of the network-based VPN provider. Such attribute properties include (but are not limited to) delay (one way and round trip), jitter, and error rate (i.e. packet loss/error). Currently these types of statistics are provided by some service providers, but are based largely on average values that are insufficient for the customer to compute real-time path characterization.

Up-to-the-minute values for various path characteristics such as delay and jitter are desired in order to qualify a particular path on a real-time basis so as to ease troubleshooting should some path characteristics such as the delay be detected as abnormally high, make instantaneous repairs to broken paths, or in order to choose alternate paths (i.e.: change routing behavior so as to obscure the network defect from the customer), or just to obtain information as to whether the requested path attributes are being delivered by the core network at any given point in time.

Certain applications, such as the Service Assurance Agent (SAA) available from Cisco Systems, Inc. of San Jose, Calif., may be used by the customer between their customer edge routers to verify the end-to-end path using IP protocol packets. These provide important information about the overall end-to-end path, but do not provide any direct information about the critical core network paths between the provider's PE routers that actually carry the IP traffic between their sites. For this reason the customer is unable to ascertain in which segment of the network a particular problem is located, or what specific path characteristics are being delivered at any particular point in time. Such information could be used by a network-based IP customer to trigger appropriate QoS parameter setting adjustment on their PE to CE links, trigger a local link update and so on, should an Service Level Agreement (SLA) degradation cause be located on such links. This information must be gathered by the Service Provider using MPLS-specific tools and algorithms to assure their accuracy and their efficiency when used to correct any defects detected by them.

In a particular example, a client has the ability to identify a set of "important" destinations for which the gathering of the path attributes is required on a real-time basis (because of the necessity to measure the performance of a particular path). Note that the term "real-time" does not refer to the frequency at which path attributes are retrieved but is used to illustrate the fact that such information is gathered upon an explicit request of an authorized CE. The client is able to identify the set of important destinations which to gather path attributes.

Many label switched paths may be used to transport the traffic for many different applications such as Traffic Engineering or MPLS L3 VPN between end points of the MPLS network. In some cases, these paths may contain many parallel equal cost branches called load-share paths (LSPs). These paths may be rather divergent as they traverse the network, but ultimately terminate at the same end points. These paths allow traffic to be better distributed across equal cost links, thereby better utilizing the available bandwidth in the network. Load-share paths, although an advantage in its own right, also pose a potential difficulty in the way of testing each one of these paths for characteristics. Further adding to this difficulty is the fact that only a subset of these LSPs are in use by any given VPN at any given point in time. The actual choice of paths is also largely dependent on the local forwarding decisions made by specific types of forwarding hardware (i.e.: routers).

SUMMARY

Conventional mechanisms such as those explained above suffer from a variety of deficiencies. One such deficiency is that operators have to "discover" the paths and combinations thereof used by used by the VPNs using manual means such as screen-scraping numerous Command Line Interface (CLI) screens on each device along the LSP. This is time-consuming and prone to error, inaccuracies, is cumbersome, and in the end, may be too slow to allow an operator to react to the changes in a VPN network.

Embodiments of the invention significantly overcome such deficiencies and provide mechanisms and techniques that automatically determine which LSP paths may be in use by a given L3 VPN by determining which PE routers and paths to those routers will be used. This allows a system to know exactly which LSPs are important for a particular VPN and allows them to be verified or otherwise measured.

By way of the presently described method and apparatus the paths used by the VPN (and by the tools used to test those paths) are discovered dynamically, as well as any updates to these paths, thereby allowing the LSP discovery process to run without operator intervention. For instance, if a path is no longer used, it is automatically pruned from the list of paths to test. In the past, an operator had to manually discover this and prune it, resulting in wasted network bandwidth and processing, as well as the potential for attending to invalid alarms thrown due to these paths not responding to testing (because they no longer existed). Additionally, the method and apparatus can filter entries if certain PEs are not desired in the list of PEs to be verified. For example, if an operator employs a vast number of PEs, it may wish to only test a subset of these PEs (perhaps based on some statistical confidence or local heuristic). Another important use is to filter entries which are situated beyond a particular ASBR, due to their potentially large number.

The present method and apparatus provides the ability to test the paths between any two PE devices once and only once. In the case of L3 VPN, a PE (PE1) may host more than one Virtual Routing Forwarding instance (e.g.: VPN), and those VPNs may have connections to the same remote PE (PE2). In this case, the obvious use might test the paths between VRFs A and B from PE1 to PE2, thereby testing the same LSP twice (it is often the case that the same LSP run between PEs across a core network). The present method and apparatus is able to filter-out duplicates, further optimizing and enhancing its utility.

While a particular embodiment is described based on routing updates which are actually used to forward data, and thus the data stored in the data base managed by the invention is kept up-to-date instantaneously, it is also possible to implement the invention using a timer, which when expires, causes the invention to examine the current routing data base and update itself accordingly.

In a particular embodiment of a method for producing and maintaining a repository of service level test points for network based VPNs includes selecting to perform the method for a single Autonomous System (AS) configuration or a multiple AS configuration for at least one VPN of interest. When the selection is for a single AS configuration then next hops are found for the at least one VPN of interest. Next, VPN prefixes associated with said at least one VPN of interest are found and a set of Label Switching Paths (LSPs) in use for said at least one VPN of interest are produced from the next hops and the VPN prefixes. The set of LSPs is made available to other processes.

When the selection is that there is more than one AS, then routers in the present AS associated with said at least one VPN of interest are found. All Provider Edge (PE) routers and/or Autonomous System Boundary Routers (ASBR) associated with the at least one VPN of interest are found. A set of LSPs in use for the at least one VPN of interest is produced. The set of LSPs is made available to other processes.

Other embodiments include a computer readable medium having computer readable code thereon for providing a process for producing and maintaining a repository of service level test points for network based VPNs. The medium includes instructions for selecting to perform the method for a single Autonomous System (AS) configuration or a multiple AS configuration for at least one VPN of interest. The medium further includes instruction for, when there is not more than one AS, finding next hops for the at least one VPN of interest. The medium also includes instructions for finding VPN prefixes associated with the at least one VPN of interest and for producing a set of Label Switching Paths (LSPs) in use for the at least one VPN of interest from the next hops and the VPN prefixes. The medium additionally includes instructions for making the set of LSPs available to other processes.

The medium may additionally include instructions for, when the selection is that there is more than one AS routers associated with said at least one VPN of interest are found, to find all Provider Edge (PE) routers associated with the at least one VPN of interest. The medium include instructions for producing a set of LSPs in use for the at least one VPN of interest. The medium additionally includes instructions for making the set of LSPs available to other processes.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a process for producing and maintaining a repository of service level test points for network based VPNs as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method and apparatus for producing and maintaining a repository of service level test points for network based Virtual Private Networks (VPNs) as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
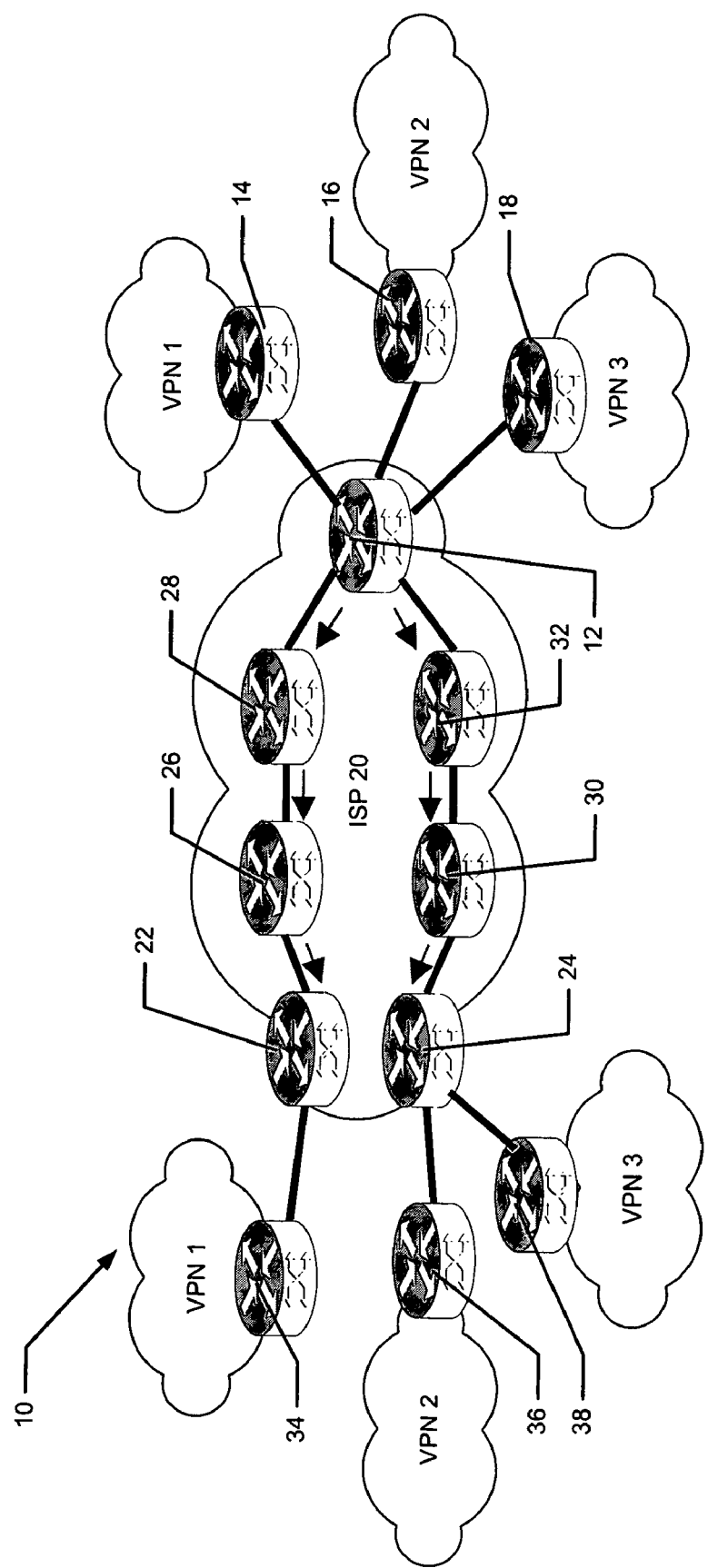
FIG. 1 illustrates a block diagram of a basic VPN deployment scenario.

Within a MPLS L3 VPN network, a signaling protocol such as BGP establishes sessions between provider edge (PE) routers and autonomous system border routers (ASBRs). These paths are realized as MPLS Label Switched Paths (LSPs). The LSPs are signaled via a variety of MPLS control plane signaling protocols (i.e.: LDP or RSVP-TE). A signaling protocol such as BGP exchanges VPN routes (VPNv4 or VPNv6) between PEs and ASBRs while recording the LSPs that are used to reach the remote PE router. The LSP is assigned as a recursive next-hop for each VPNv4 route which is installed for a particular VPN. The LSPs that are used by VPNs begin with a label stack of two labels. The outer is an IGP label. This label is popped off just before the BGP next-hop. The inner label is a VPN label, which is popped off at the final destination of the LSP.

The method and apparatus for the creation and maintenance of a self-adjusting repository of service level diagnostics test points for network based VPNs (also referred to as LSP Discovery) periodically scans through all of the routes in the desired VRF routing tables and receives routing updates in order to build a database of the next-hop LSPs that are assigned to each of the routes. Filtering policies are then applied to discard undesired end points from the database. It is at this time that duplicates are also removed from the data base, thus preventing testing tools from duplicating tests to the same next hop on behalf of different VPNs (see example given above). The database can then be read by client path testing tools to automatically provide them with the end points to which to test LSP path characteristics for.

LSP discovery can be used for both single AS configurations and multiple AS configurations. In a single AS configuration, the LSPs used to reach every BGP next-hop in use by a VRF are discovered. This approach will allow for the verification of all PEs and ASBRs in the AS. This may not provide end-to-end coverage of more complicated VPN topologies. In some Inter-AS cases, some PEs and ASBRs in other ASs will not be reached. The LSP discovery for multiple AS configurations discovers VPN prefixes instead of next-hops.

The following are the expected outcomes for LSP discovery under different VPN scenarios when correctly configured.
  1. Simple VPN—LSP discovery will discover the LSPs to each destination PE in use.
  2. Inter-AS (back-to-back VRFs)—This case is the same as the above described case, however, the PEs (ASBRs) discovered will all be at the edge of the same AS.
  3. Inter-AS (VPNv4 on ASBRs, next-hop-self on ASBRs)—The LSPs to each ASBR on the edge of the same AS will be discovered.
  4. Inter-AS (VPNv4 on ASBRs, no next-hop-self)—The LSPs to each ASBR across the AS boundary will be discovered.
  5. Inter-AS (IPv4+label on ASBRs)—The LSPs to each PE in the other AS will be discovered
  6. Inter-AS (non-VPN MPLS transit provider)—This case is the same as the fifth case, although LSP ping will be required to push two labels to forward messages to the remote PE.
  7. CsC (IP or MPLS within lower tier)—In the carrier supporting carrier case, LSP discovery would only be applicable within the core ISP since the lower tier providers do not use VRFs. This case would be the same as the first case.
  8. CsC (Hierarchical VPNs)—LSP discovery will discover the LSPs to all of the PEs in use in the same tier only.

Referring now to FIG. 1, a particular embodiment of a network topology 10 is shown. The network topology 10 includes three VPNs: VPN 1, VPN2 and VPN3. One end of VPN 1, VPN2 and VPN 3 is in communication with PE 12. PE 12 is part of Internet Service Provider (ISP) 20, which also includes PE 22 and PE 24. Within ISP 20, between PE 12 and PE 22 are Provider (P) routers 26 and 28. Similarly, between PE 12 and PE 24 are P routers 30 and 32. VPN 1 thus extends from router 14, to PE 12, to P 28 to P 26 to PE 22 to router 34. VPN 2 extends from router 16, to PE 12, to P 32 to P 30 to PE 24 to router 36. VPN 3 extends from router 18, to PE 12, to P 32 to P 30 to PE 24 to router 38.

From the point-of-view of router PE 12, these VPNs are reachable remotely via BGP next-hops PE 22 and PE 24. When LSP discovery runs on PE 12, a database is generated based from the local VRF routing tables. The database in this example contains two next hop entries; one for PE 22 and one for PE 24. PE 22 is used by VPN 1 and PE 24 is used by VPN 2 and VPN 3.

The routing table IDs are maintained per next-hop to distinguish which next-hops are contained in which VRFs. Note that it is possible that many VPNs may utilize the same next-hop. For each next-hop entry, the IPv4 prefix of the BGP next-hop in the global routing table is provided so that it can be pinged using the IPv4 prefix FEC of LSP ping. This is also useful for IPv6, traffic engineering and any otherconnection between BGP peers.

Figure 2:
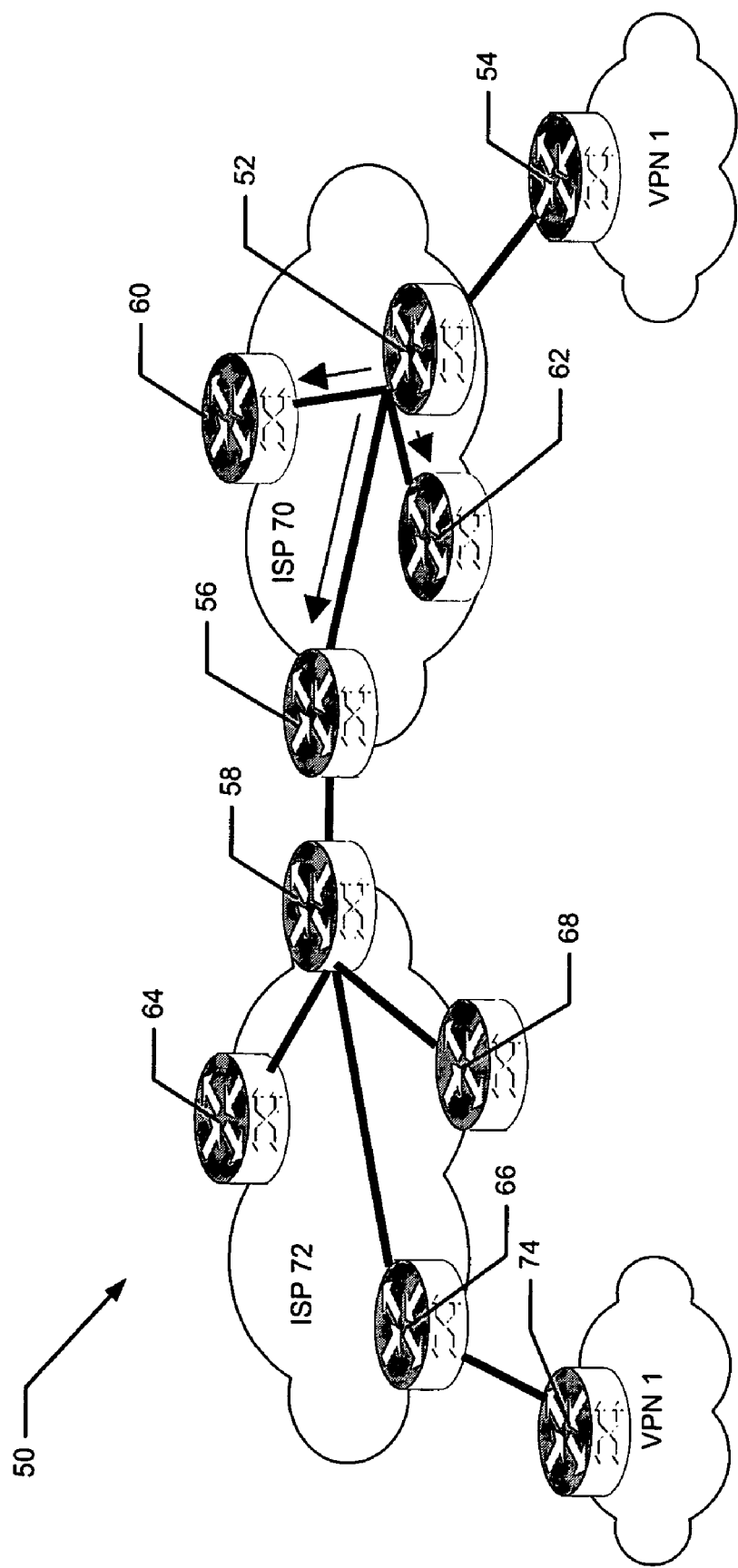
FIG. 2 illustrates a block diagram of an Inter-AS VPN deployment scenario.

FIG. 2 illustrates a block diagram of an Inter-AS VPN deployment scenario. Referring now to FIG. 2, a particular embodiment topology 50 is shown where LSP discovery for a single AS configuration may not find all PEs in a different AS. In topology 50, a first VPN 54 is in communication with PE 52. PE 52 is part of first ISP 70. First ISP 70 includes PE 60 and PE 62. A second IPS network 72 is in communication with first ISP 70. Second ISP 72 includes an ASBR 58 in communication with ASBR 56 of first ISP 70. ASBR 58 is also in communication with PE 64, PE 66 and PE 68. PE 66 is also in communication with router 74 as part of the first VPN. In this Inter-AS VPN case, the router ASBR 56 is discovered as a BGP next-hop for PE 52. There is no way for PE 52 to determine the topology past ASBR 56. In this example there are other PE routers (PE 64, PE 66 and PE 68) that are hidden in the other AS behind ASBR 58. In this environment the LSP discovery process running on PE 52 would discover PE 60, ASBR 56 and PE 62.

Figure 3:
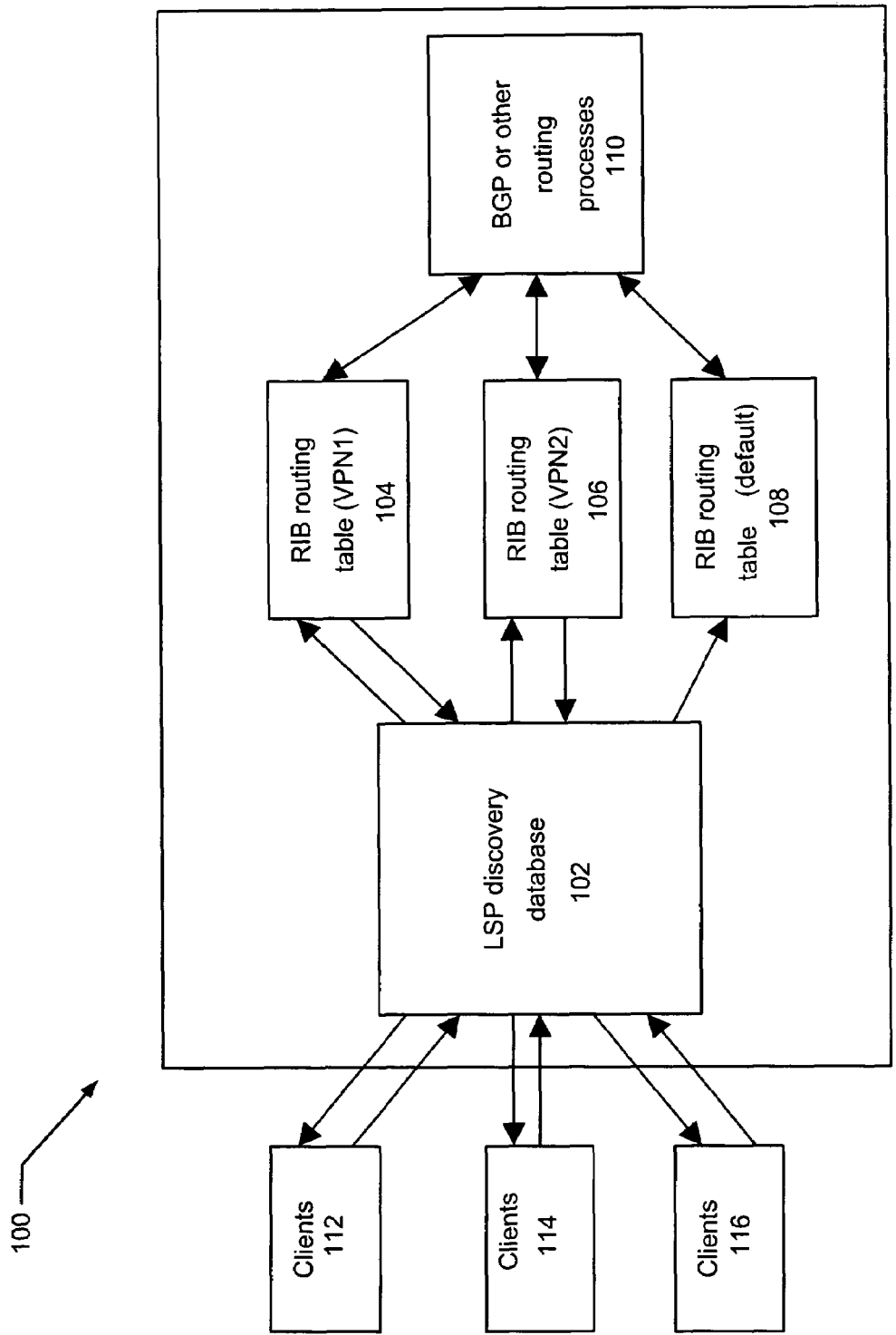
FIG. 3 illustrates a block diagram of an LSP discovery system in accordance with embodiments of the invention.

For inter-AS configurations, further processing which discovers every LSP in use by a VRF is performed. This approach is an end-to-end solution and discovers all PEs and ASBRs even in more complicated VPN topologies. The drawback is that there are far more LSPs that need to be verified. In fact, every prefix in the VRF routing table may have to be discovered in order to guarantee all PEs are verified Referring now to FIG. 3, a particular embodiment of an LSP discovery system 100 is shown. The system 100 includes a LSP discovery database 102, which interacts with the VRF routing tables (also referred to as Routing Information Tables (RIBs)) 104, 106 and 108 to collect all of the unique BGP next-hops that are in use. Clients 112, 114 and 116 of LSP discovery can retrieve this information via API calls into the database 102.

The LSP discovery database 102 stores all the next-hops that have been discovered from route prefixes within the routing table tables 104, 106, 108. Multiple prefixes from multiple routing table tables might share the same next-hop entry in the database. This database is kept up-to-date through scans of the routing tables and through route updates from the processes 110. Clients 112, 114 and 116 perform lookups in this table through APIs. Clients 112, 114 and 116 are notified of database changes via registry calls.

Routing tables 104, 106 and 108 store routes for each VPN along with next-hop information. These tables are scanned to find next-hops to be put into the database. Border Gateway Protocol (BGP) is an example of a routing process that distributes routing information from the network into the routing table tables 104, 106 and 108.

The LSP discovery system performs certain operations for different types of events that occur. At initialization, the LSP discovery database is started. VRF and global routing tables are scanned to populate the LSP discovery database. Routing table refresh requests are used to keep the database up-to-date. When a routing table refresh request is serviced, the routing table is scanned. Entries in the database are added or flagged as being refreshed. Any entries not refreshed are removed. Clients are notified of additions and removal. The number of VPN prefixes using a next hop are counted and the next hop is removed if the count goes to zero.

Clients can perform lookups in the database at any time after initialization. When trying to discover all LSPs in use, load sharing may become a concern. Any particular LSP can be split in different directions. The information obtained can be provided to other tools which are used to find load sharing paths.

Figure 4A:
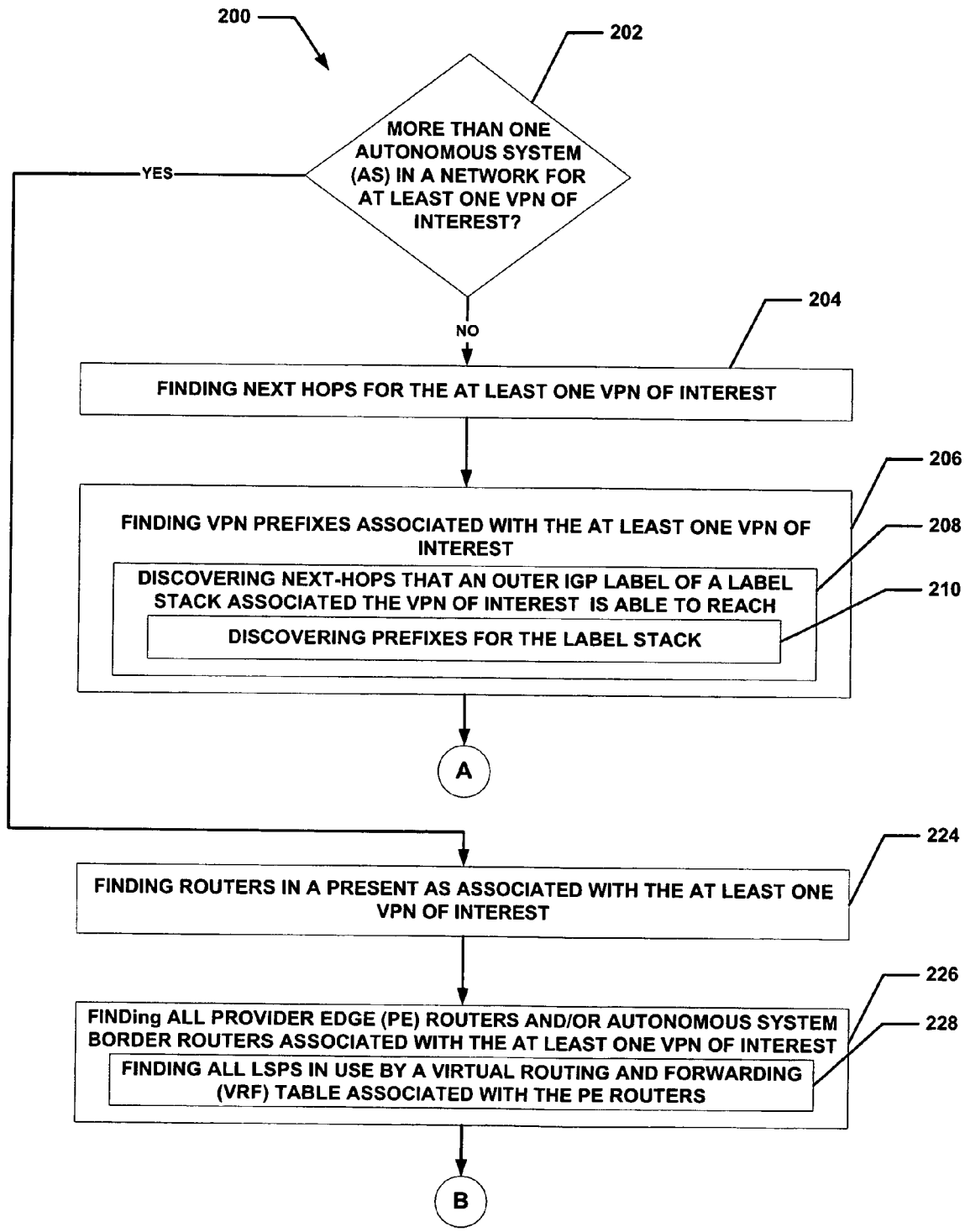
FIGS. 4A and 4B comprise flow diagrams of a method for the creation and maintenance of a self-adjusting repository of service level diagnostics test points for network based VPNs in accordance with embodiments of the invention.
Figure 4B:
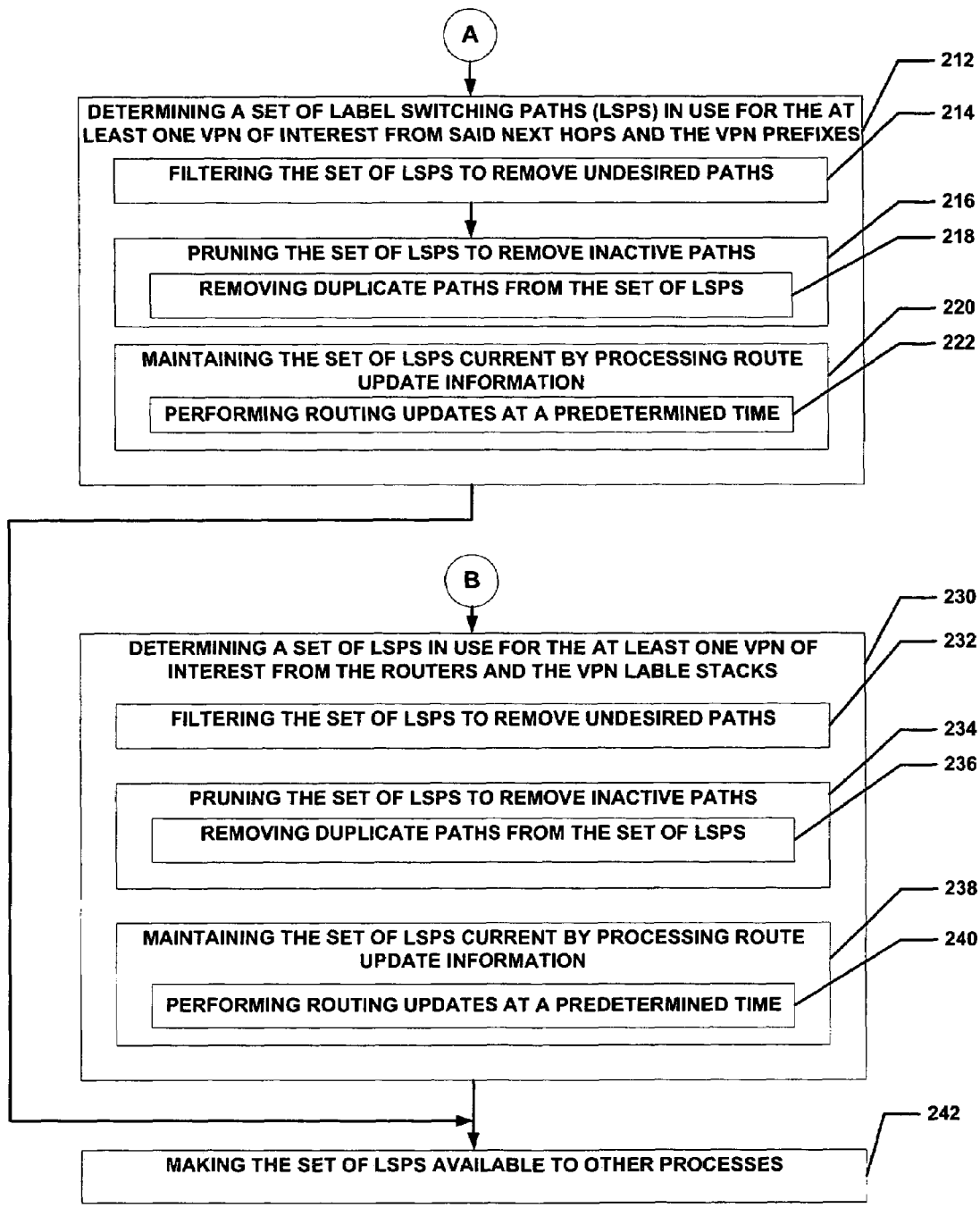

A flow chart of the presently disclosed method is depicted in FIGS. 4A and 4B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring to FIGS. 4A and 4B, a particular embodiment of a method for producing and maintaining a repository of service level test points for network based VPNs 200 is shown. The method begins with decision block 202 wherein a determination is made regarding whether there is more than one Autonomous System (AS) in a network for at least one VPN of interest. When there is not more than one AS then processing with processing block 204. When there is more than one AS then processing continues with processing block 224.

In processing block 204, when the determination in decision block is that there is not more than one AS for the VPN of interest, next hops are found for the at least one VPN of interest.

In processing block 206, VPN prefixes associated with the at least one VPN of interest are found. As shown in processing block 208, the next-hops that an outer IGP label of a label stack associated the VPN of interest is able to reach are found. In processing block 210, prefixes for the label stack are discovered.

Processing continues at processing block 212, wherein a set of Label Switching Paths (LSPs) in use for the at least one VPN of interest are determined from the next hops and the VPN prefixes. As shown in processing block 214, the set of LSPs may be filtered to remove undesired paths. This may be done to reduce the number of PE routers being discovered and the associated LSPs. In processing block 216, the set of LSPs may be pruned to remove inactive paths. The accounts for paths that have been taken down or otherwise are no longer in use. In processing block 218, the pruning further includes removing duplicate paths from the set of LSPs. Processing block 220 discloses maintaining the set of LSPs current by processing route update information. The updates may occur dynamically as part of the routing process. Alternately, as shown in processing block 222, routing updates can be performed at a pre-determined time.

In processing block 224, when the determination in decision block is that there is more than one AS for the VPN of interest routers in a present AS associated with the at least one VPN of interest are found.

In processing block 226, all Provider Edge (PE) routers and/or autonomous System Border Routers (ASBRs) associated with the at least one VPN of interest are found. As shown in processing block 228, all LSPs in use by a Virtual Routing and Forwarding (VRF) table associated with the PE routers are found.

As shown in processing block 230, a set of LSPs in use for the at least one VPN of interest are determined from the routers and the VPN label stacks. As shown in processing block 232, the set of LSPs may be filtered to remove undesired paths. This may be done to reduce the number of PE routers being discovered and the associated LSPs. In processing block 234, the set of LSPs may be pruned to remove inactive paths. The accounts for paths that have been taken down or otherwise are no longer in use. In processing block 236, the pruning further includes removing duplicate paths from the set of LSPs. Processing block 238 discloses maintaining the set of LSPs current by processing route update information. The updates may occur dynamically as part of the routing process. Alternately, as shown in processing block 240, routing updates can be performed at a pre-determined time.

In processing block 242, after completion of processing block 222 or processing block 240, the resulting set of LSPs are made available to other processes. In such a manner a discovery process has been performed to identify a set of LSPs for a VPN, which can be used by other processes.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for producing and maintaining a repository of service level test points for network based Virtual Private Networks (VPNs) comprising:
   selecting to perform said method for a single Autonomous System (AS) configuration or for a multiple AS configuration in a network for at least one VPN of interest;
   when said selecting results in selecting a single AS configuration, then:
      finding next hops for said at least one VPN of interest;
      finding VPN prefixes associated with said at least one VPN of interest; and
      determining a set of Label Switching Paths (LSPs) in use for said at least one VPN of interest from said next hops and said VPN prefixes;
   when said selecting results in selecting a multiple AS configuration, then:
      finding routers in a present AS associated with said at least one VPN of interest; and
      finding all Provider Edge (PE) routers and Autonomous System Border Routers (ASBRs) associated with said at least one VPN of interest;
      determining a set of LSPs in use for said at least one VPN of interest from said routers; and
   making said set of LSPs available to other processes.

2. The method of claim 1 wherein said determining a set of LSPs further comprises filtering said set of LSPs to remove undesired paths.

3. The method of claim 1 wherein said determining a set of LSPs further comprises pruning said set of LSPs to remove inactive paths.

4. The method of claim 3 wherein said pruning includes removing duplicate paths from said set of LSPs.

5. The method of claim 1 wherein said determining a set of LSPs further comprising maintaining said set of LSPs current by processing route update information.

6. The method of claim 5 wherein said maintaining comprises performing routing updates at a pre-determined time.

7. The method of claim 1 wherein said finding next hops for said at least one VPN of interest comprises discovering next-hops that an outer IGP label of a label stack associated the VPN of interest is able to reach.

8. The method of claim 7 wherein said finding VPN prefixes associated with said at least one VPN of interest comprises discovering prefixes for said label stack.

9. The method of claim 1 wherein said finding all Provider Edge (PE) routers associated with said at least one VPN of interest comprises finding all LSPs in use by a Virtual Routing and Forwarding (VRF) table associated with said PE routers.

10. A Label Switching Paths (LSP) discovery system comprising:
    an LSP discovery database in communication with at least one client;
    a default routing table in communication with said LSP discovery database and with at least one routing process;
    at least one VPN routing table in communication with said LSP discovery database and with said at least one routing process; and
    a routing process for distributing routing information into said routing tables, and wherein said system is capable of producing and maintaining a repository of service level test points for network based Virtual Private Networks (VPNs) in said LSP discovery database;
    wherein said system is capable of performing the operations of selecting to perform said method for a single Autonomous System (AS) configuration or for a multiple AS configuration in a network for at least one VPN of interest:
    when said selecting results in selecting a single AS configuration, then:
       finding next hops for said at least one VPN of interest;
       finding VPN prefixes associated with said at least one VPN of interest; and
       determining a set of Label Switching Paths (LSPs) in use for said at least one VPN of interest from said next hops and said VPN prefixes;
    when said selecting results in selecting a multiple AS configuration, then:
       finding routers in a present AS associated with said at least one VPN of interest; and
       finding all Provider Edge (PE) routers and Autonomous System Border Routers (ASBRs) associated with said at least one VPN of interest;
       determining a set of LSPs in use for said at least one VPN of interest from said routers; and
    making said set of LSPs available to other processes.

11. The LSP discovery system of claim 10 wherein said LSP discovery database interacts with said routing tables to collect next-hops that are in use.

12. The LSP discovery system of claim 10 wherein information from said LSP discovery database is available to at least one client.

13. The LSP discovery system of claim 12 wherein said clients are notified of database changes.

14. The LSP discovery system of claim 10 wherein said database is maintained by performing scans of said routing tables and through route updates.

15. The LSP discovery system of claim 10 wherein said routing tables store routes for each VPN with next-hop information.

16. A system for producing and maintaining a repository of service level test points for network based Virtual Private Networks (VPNs) comprising:
    means for selecting to perform said method for a single Autonomous System (AS) configuration or for a multiple AS configuration in a network for at least one VPN of interest;
    when said selecting results in selecting a single AS configuration, then:
       means for finding next hops for said at least one VPN of interest;
       means for finding VPN prefixes associated with said at least one VPN of interest; and
       means for determining a set of Label Switching Paths (LSPs) in use for said at least one VPN of interest from said next hops and said VPN prefixes;
    when said selecting results in selecting a multiple AS configuration, then:
       means for finding routers in a present AS associated with said at least one VPN of interest; and means for finding all Provider Edge (PE) routers and Autonomous System Border Routers (ASBRs) associated with said at least one VPN of interest;

means for determining a set of LSPs in use for said at least one VPN of interest from said routers; and means for making said set of LSPs available to other processes.

17. The system of claim 16 wherein said means for determining the set of LSPs in use for said at least one VPN of interest from said routers further comprises means for removing inactive paths from said set of LSPs.

18. The system of claim 16 wherein said means for determining the set of LSPs in use for said at least one VPN of interest from said routers further comprises means for removing undesired paths from said set of LSPs to reduce the number of PE routers found.

19. The system of claim 16 wherein said means for determining the set of LSPs in use for said at least one VPN of interest from said routers further comprises means for removing duplicate paths from said set of LSPs.

* * * * *

UNITED STATES PATENT AND TRADEMARK OFFICE
CERTIFICATE OF CORRECTION

PATENT NO. : 7,447,167 B2 Page 1 of 1
APPLICATION NO. : 11/091058
DATED : November 4, 2008
INVENTOR(S) : Thomas D. Nadeau et al.

It is certified that error appears in the above-identified patent and that said Letters Patent is hereby corrected as shown below:

On the Title Page, Item -75-
Inventors: "...Robert Hanzl, Hostivice (CS)" should read -- ...Robert Hanzl, Hostivice (CZ) --

Signed and Sealed this

Sixth Day of January, 2009

JON W. DUDAS
*Director of the United States Patent and Trademark Office*